INVENTOR.
Casimer J. Cislo

Feb. 3, 1959 C. J. CISLO 2,872,206
INDEPENDENT DIRIGIBLE WHEEL SUSPENSION
Filed Sept. 14, 1956 2 Sheets-Sheet 2
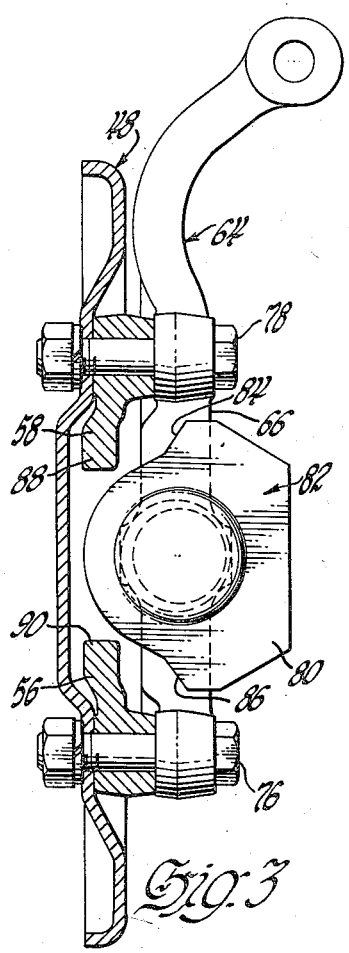
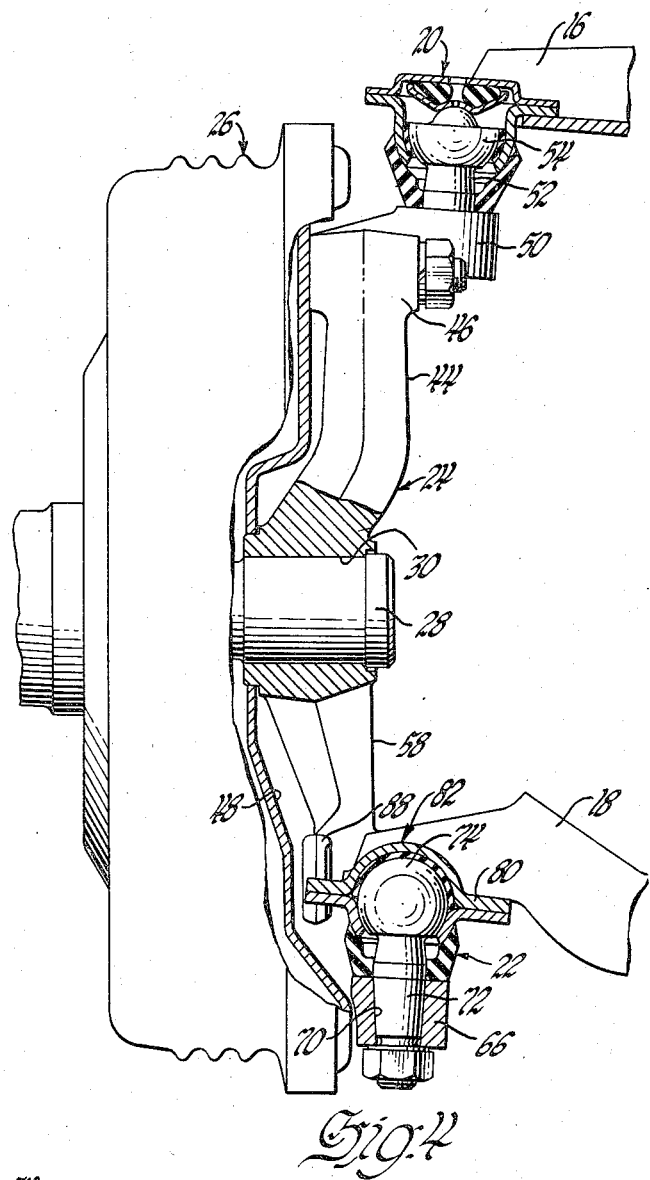
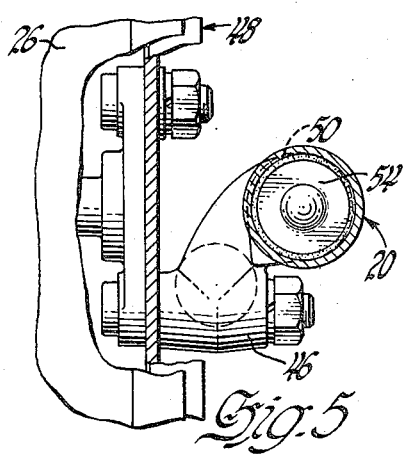
INVENTOR.
Casimer J. Cislo
BY
Paul Fitzpatrick
ATTORNEY United States Patent Office 2,872,206
Patented Feb. 3, 1959

2,872,206

INDEPENDENT DIRIGIBLE WHEEL SUSPENSION

Casimer J. Cislo, Detroit, Mich., assignor to General Motors Corporation, Detroit, Mich., a corporation of Delaware Application September 14, 1956, Serial No. 609,911

3 Claims. (Cl. 280—96.2)

This invention relates to vehicle wheel suspension and more particularly to independent dirigible wheel suspension.

According to the present invention, a steerable vehicle wheel is mounted for independent movement relative to a vehicle frame by means of a pair of vertically spaced transversely extending wishbone arms, the inner ends of which are pivoted on the frame on non-parallel axes. The wheel is steerably connected to the outer ends of wishbone arms by means of a pair of vertically spaced ball joint assemblies, each of which are connected respectively to one of the wishbone arms and to a forged wheel spindle support associated with the wheel. The spindle support, preferably forged, is of inverted Y-shaped having attachment apertures formed therein at each extremity for connection with the brake backing plate for the wheel. The upper leg of the spindle is formed with a tapered aperture for receiving the tapered shank of the upper ball joint. Coincidentally attached to the backing plate with the lower diverging legs of the spindle support is a forged steering arm which is provided with a tapered aperture for receiving the tapered shank of the lower ball joint so that the latter is recessed in a pocket formed by the diverging legs and the bridging portion of the steering arm, thus permitting the lower ball joint to be located in very close proximity to the vertical longitudinal midplane of the dirigible wheel.

An object of the present invention is to provide an improved dirigible wheel steering knuckle assembly.

Another object is to provide a triple branch steering knuckle permitting connection to a brake backing plate at three widely spaced points, thus assuring improved alignment of the backing plate and brake shoes with the wheel spindle.

A further object is to provide in an independent suspension, a ball joint steering knuckle for a dirigible wheel affording minimum steering axis offset.

A still further object is to provide an independent dirigible wheel suspension including vertically spaced parallel wishbone arms connected to the steerable wheel spindle support by means of ball joints, wherein the spindle support is so constructed as to straddle one of the ball joints, the said ball joints being supported on a member bridging the straddling portion of the spindle support.

Still a further object is to provide a structure of the stated character wherein the spindle support and one of the ball joint housings cooperate to establish limits of steering movement of the wheel.

These and other objects, advantages and features of the invention will become more readily apparent as reference is had to the accompanying specification and drawings wherein:

Fig. 3 is an enlarged top plan view, partly in section, looking in the direction of arrows 3—3 of Fig. 2.

Fig. 4 is an enlarged fragmentary front elevational view looking in the direction of arrows 4—4 of Fig. 2, certain parts being shown in section and broken away; and Fig. 5 is an enlarged top plan view, partly in section, looking in the direction of arrows 5—5 of Fig. 2.

Figure 1:
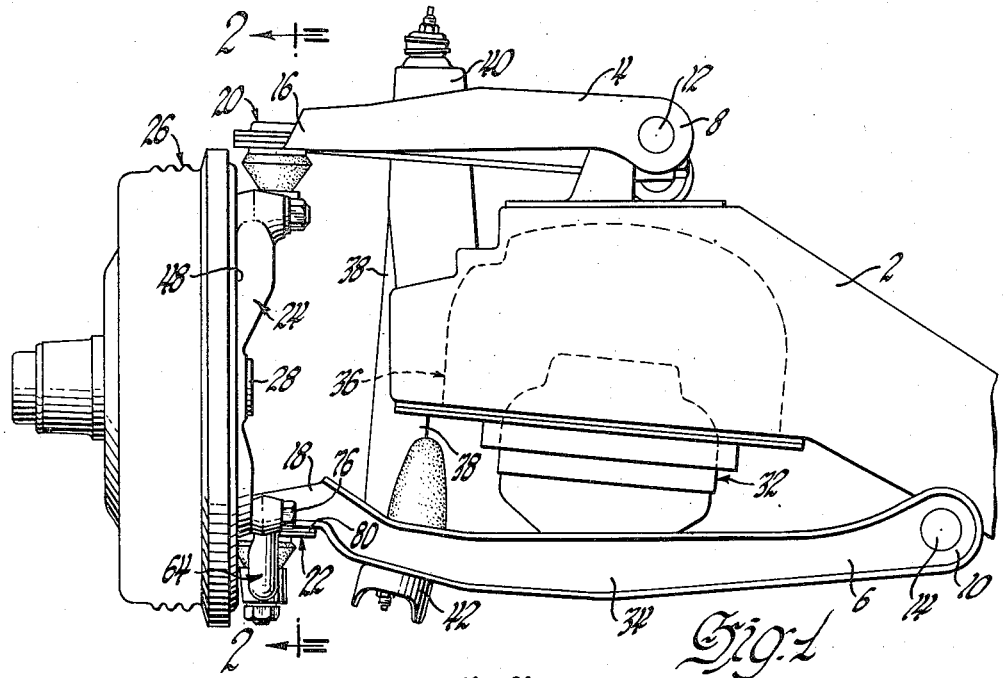
Fig. 1 is a fragmentary front elevational view of a right front independent wheel suspension.

Referring now to the drawings and particularly Fig. 1, there is illustrated a front wheel independent suspension wherein the reference numeral 2 designates generally a vehicle frame front cross member. A pair of vertically spaced transversely extending wishbone arms 4 and 6 are connected at their respective inner ends 8 and 10 to the cross member 2 by means of conventional pivot connections 12 and 14. In the preferred embodiment, pivot 14 extends generally parallel with the ground while pivot 12 is inclined downwardly and rearwardly relative to pivot 14. At their respective outer ends 16 and 18, arms 4 and 6 have attached thereto upper and lower ball joint assemblies 20 and 22. Members 20 and 22, in turn, are also connected to a vehicle wheel spindle support 24, in a manner shortly to be described, to permit steerability of the wheel, not shown, rotatably mounted with brake drum assembly 26 on wheel spindle 28. Spindle 28 is preferably press fitted into a central aperture 30 formed in support 24.

In order to resiliently support frame 2 relative to the wheel, in the preferred embodiment a fluid spring 32 is interposed between the midportion 34 of lower wishbone arm 6 and a cavity formed in the outer extremity 36 of cross member 2. Inasmuch as the precise construction of fluid spring 32 forms no part of the present invention a detailed description thereof will be omitted. In order to provide damping of road shock and accomplish ride control, a telescopic shock absorber 38 is arranged to react between the outer end of lower wishbone arm 6 and a vertically extending support bracket 40 connected to frame 2. Since fluid spring 32 occupies the major portion of the space between arm 6 and cross frame member 2, shock absorber 38 is spaced rearwardly of both wishbone arms. The lower end of the shock absorber is therefore connected to lower wishbone arm 6 by means of a longitudinally extending plate 42 having opposite terminal portions which extend beyond the front and rear edges of wishbone arm 6. In order to reduce twisting forces imposed on arm 6 by shock absorber 38, the usual torsional roll stabilizer for the front suspension, not shown, is preferably connected to plate 42 at the end opposite the end connected to shock absorber 38.

Figure 2:
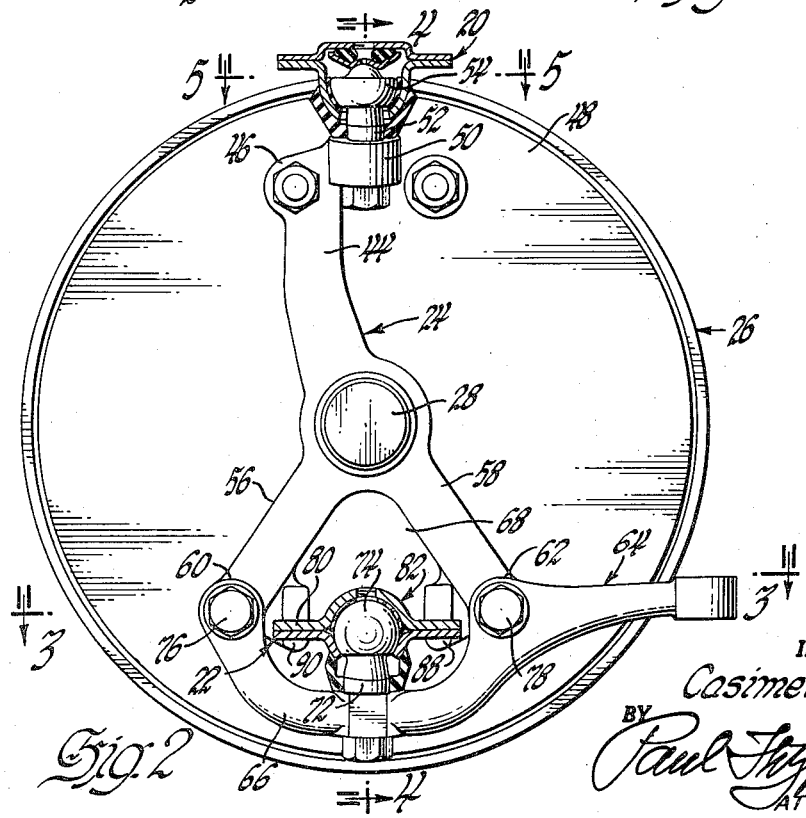
Fig. 2 is an enlarged side elevational view looking in the direction of arrows 2—2 of Fig. 1.

In order to provide an improved steering knuckle and ball joint construction, in accordance with one feature of the present invention, the wheel spindle support 24 takes the form of an inverted Y-shaped forging. As seen best in Fig. 2, the upper leg 44 is formed with an apertured attachment portion 46 for connection to the steerable wheel brake backing plate 48. Offset rearwardly from attachment portion 46 is an integral boss 50 which is apertured to receive the tapered shank 52 of the ball stud portion 54 of upper ball joint assembly 20. The lower legs 56 and 58 of spindle support 24 extends downwardly in diverging relation and are formed at their terminal ends with apertured attachment portions 60 and 62 for connection with backing plate 48. Coincidentally attached to backing plate 48 with legs 56 and 58 is a longitudinally extending steering arm 64. As seen best in Fig. 2, the forward portion 66 of arm 64 bridges the terminal ends 60 and 62 of legs 56 and 58 so as to form a generally triangular recess or pocket 68. Midway thereof, the forward portion 66 of arm 64 is formed with a vertical tapered aperture 70 which is adapted to receive the tapered shank 72 of ball stud 74 of lower ball joint assembly 22. It will therefore be seen that assembly 22 may be located in close proximity to the surface of brake backing plate 48. Hence, the degree of offset required between the steering axis defined by the upper and lower ball joints and the vertical longitudinal midplane of the wheel may be maintained at a minimum. In addition, the construction affords optimum strength without imposing severe loads on the wheel spindle support body. Further, because the forward portion 66 of steering arm 64 is swept downwardly, the effective center of lower ball joint 22 is in horizontal alignment with the bolts 76 and 78 which connect arm 64 and legs 56 and 58 to backing plate 48.

In accordance with another feature of the invention, the peripheral flange 80 of lower ball joint housing 82 is so formed as to effect limitation of angular movement of the steerable wheel. As seen best in Fig. 3, the outer periphery of flange 80 is contoured to provide abutment shoulders 84 and 86 which are adapted to be engaged by fingers 88 and 90 formed integrally on the terminal ends 60 and 62 of wheel spindle legs 56 and 58. Thus, when the wheel has been turned to predetermined angle in either direction, one or the other of abutments 84 or 86 will be engaged by the respective finger 88 or 90 and prevent further turning of the wheel.

From the foregoing it will be seen that a novel and improved front wheel suspension has been provided. It should be particularly noted that the present invention not only allows considerable reduction in the lateral offset of the steering axis defined by the ball joints 20 and 22, but in addition permits the use of relatively inexpensive ball joint assemblies of the type employing flanged sheet metal housings, whereas heretofore attempts to reduce lateral offset depended largely upon utilizing more expensive ball joint assemblies having forged housings. It will, of course, be evident that the present invention will afford even greater reduction of lateral offset if ball joints having forged housings are employed.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In a dirigible wheel suspension including pivotally mounted upper and lower control arms, a steering knuckle assembly comprising an inverted Y-shaped spindle support, a longitudinally offset portion on the upper leg of said support, a steering arm connected at spaced points to the lower diverging legs of said support, a pair of ball joint assemblies having housings connected respectively to the outer ends of said control arms, each of said assemblies including a ball stud member having a depending shank portion, means formed respectively in said offset portion of said upper leg and the portion of said steering arm between said lower legs for receiving the shank portion of the adjacent ball stud, the housing for one of said joint assemblies being contoured to provide a pair of limit stops, and a pair of abutment portions formed respectively on the lower diverging legs of said support adapted to engage one or the other of said stops upon turning of said wheel to its maximum angular position in either direction.

2. In a dirigible wheel suspension including pivotally mounted upper and lower control arms, a steering knuckle assembly comprising an inverted Y-shaped spindle support, a longitudinally offset portion on the upper leg of said support, a steering arm connected at spaced points to the lower diverging legs of said support, a pair of ball joint assemblies having flanged sheet metal housings connected respectively to the outer ends of said control arms, each of said assemblies including a ball stud member having a depending shank portion, means formed respectively in said offset portion of said upper leg and the portion of said steering arm between said lower legs for receiving the shank portion of the adjacent ball stud, the flange for one of said ball joint housings being contoured to provide a pair of limit stops, and a pair of abutment portions formed respectively on the lower diverging legs of said support adapted to engage one or the other of said stops upon turning of said wheel to its maximum angular position in either direction.

3. In a dirigible wheel suspension including pivotally mounted upper and lower control arms, a steering knuckle assembly comprising an inverted Y-shaped spindle support, a longitudinally offset portion on the upper leg of said support, a steering arm connected at spaced points to the lower diverging legs of said support, a pair of ball joint assemblies having flanged sheet metal housings connected respectively to the outer ends of said control arms, each of said assemblies including a ball stud member having a depending shank portion, means formed respectively in said offset portion of said upper leg and the portion of said steering arm between said lower legs for receiving the shank portion of the adjacent ball stud, the flange for the lower ball joint housings being contoured to provide a pair of limit stops, and a pair of abutment portions formed respectively on the lower diverging legs of said support adapted to engage one or the other of said stops upon turning of said wheel to its maximum angular position in either direction.

References Cited in the file of this patent

UNITED STATES PATENTS

| | | |
|---|---|---|
| 2,556,767 | McCann | June 12, 1951 |
| 2,771,302 | Booth et al. | Nov. 20, 1956 |